W. J. KNOX.
METHOD AND APPARATUS FOR TREATING OR CONVERTING COMPOUNDS PREFERABLY OF A HYDROCARBON NATURE.
APPLICATION FILED MAR. 24, 1919.

1,428,641. Patented Sept. 12, 1922.
4 SHEETS—SHEET 1.

INVENTOR
William John Knox
BY
Gifford Bull
His ATTORNEY

W. J. KNOX.
METHOD AND APPARATUS FOR TREATING OR CONVERTING COMPOUNDS PREFERABLY OF A HYDROCARBON NATURE.
APPLICATION FILED MAR. 24, 1919.

1,428,641.

Patented Sept. 12, 1922.

INVENTOR
William John Knox
BY
Gifford Bull
his ATTORNEYS

Patented Sept. 12, 1922.

1,428,641

UNITED STATES PATENT OFFICE.

WILLIAM JOHN KNOX, OF NEW YORK, N. Y., ASSIGNOR TO ERSKINE D. WARREN, OF NEW YORK, N. Y.

METHOD AND APPARATUS FOR TREATING OR CONVERTING COMPOUNDS PREFERABLY OF A HYDROCARBON NATURE.

Application filed March 24, 1919. Serial No. 284,818.

*To all whom it may concern:*

Be it known that I, WILLIAM JOHN KNOX, a citizen of the United States, residing at New York city, in the county of New York and State of New York, have invented certain new and useful Improvements in Methods and Apparatus for Treating or Converting Compounds Preferably of a Hydrocarbon Nature, of which the following is a specification.

My invention relates to a new and useful method and apparatus for treating compounds preferably of a hydrocarbon nature, in order to produce therefrom, or to recover therefrom, constituents having commercial use or application, and the invention particularly contemplates the treatment of hydrocarbons, or combinations of hydrocarbon materials or hydrocarbon bearing materials, to form other desired combinations or compounds.

I propose by performing my invention according to its preferred embodiment to produce or recover from hydrocarbon materials any desired hydrocarbon product derivable therefrom, and particularly to produce or recover such products as gasoline or motor fuel. By my invention I also contemplate recovery and conversion of desirable constituents of casing-head gas or other hydrocarbon-bearing gas, and blending or combining the said constituents and products of conversion with the desirable or necessary material derived from other hydrocarbon material, for example, hydrocarbon liquids, in order to produce a marketable product for use as gasoline or motor spirits.

In proceeding according to the proposed operation, I preferably treat the hydrocarbon materials from which the desired product or products are to be obtained by applying heat to said materials, preferably in a gradual manner, until a temperature is attained sufficiently high to break their molecules into smaller fragments or aggregates, and to maintain them under a pressure which will cause the vapors thus produced to combine to form a desired product of a chemically saturated nature. In performing the method according to the preferred embodiment with the object just stated in view, the desired product, together with any excess of fixed gas, is removed from the cycle at a point of lowered temperature, and the remaining gas, vapor and liquid may be retained within the cycle to be again subjected to conditions established therein, in order to produce a further recovery of desired product.

The preferred embodiment of my invention also includes a novel and efficient manner of applying the necessary heat to the cycle by means of hydrocarbon vapor and gases produced from the hydrocarbons under treatment, and to apply heat from an external source gradually to such gases and vapors, so that the larger most easily dissociable molecules will break down first, at a point of lower temperature, and the more difficultly dissociable molecules will continue to dissociate in the order of their resistance to heat as they progress in their passage through the system to the point of maximum temperature. By this method of procedure, I do not cause violently disruptive and destructive dissociation, and excessive formation of carbon and fixed gases, such as hydrogen, but on the contrary a higher percentage of the hydrocarbon material treated is converted by my process into the desired product than by any other method with which I am familiar.

In carrying out my invention, I preferably maintain within the apparatus or cycle a predetermined pressure of the hydrocarbon gases and vapors, such pressure being maintained by an external means, such as a compressor, and such pressure being independent of the temperature conditions; and I also maintain and control the desired temperature conditions throughout the cycle by regulating means independent of the pressure regulating means. By this method of procedure, I am able to regulate and maintain such relative and absolute conditions of heat and pressure, as to result in an efficient production and quality of the desired product from the raw or starting hydrocarbon materials.

According to one of the refinements of my invention, I pass all gases and vapors leaving the system through an absorbing device, in which device the liquid hydrocarbons entering the system in reverse direction act as absorbing media for said vapor and gas, whereby said vapors and some of the gases are absorbed by the hydrocarbon oil and returned therewith to the cycle for further treatment, so that practically only a dry, fixed gas passes out of the system as a by-product, and the absorbed light vapors being returned to the system or cycle not only continue to act as heat carriers, but together with the fixed gases therein serve to maintain the most desirable atmosphere within the apparatus for efficient conversion of the hydrocarbon materials into the desired product. This method of retaining all unconverted vapors within the system until they are either converted into the desired product by the temperature-pressure conditions, or broken down into gases, adds greatly not only to the economy of the operation, but to the quality of the product.

An economically important advantage of my invention resides in the regeneration and conservation of heat by the cyclic operation, because all of the liquid hydrocarbon material, which it is desired to dissociate and recombine, passes into and through the cycle in reverse direction to the travel of the heated gases and vapors, and being heated thereby, returns the heat to the cycle.

In practicing my invention according to the preferred embodiment, I do not subject the oil or the liquid hydrocarbon materials to the direct action of flame applied to the wall of a receptacle, or other element in contact with the oil, so that I thereby avoid subjecting the oil to excessively high temperatures, which would result in an undesirable amount of the oil being broken down into final products, such as carbon, heavy tar, hydrogen and other light gases. This has been one of the chief objections to previously known conversion and cracking processes, of which I am aware, in which the walls of the containing vessel, or other element in contact with the oil, must be heated to an excessive temperature in order to produce the required temperature for cracking in the body of the oil, and consequently the oil in contact with the wall of the vessel or other element is burnt or scorched, with the resultant breaking down into carbon, tar and light gases, to a very large extent. In contradistinction to this, I prefer, according to my invention, to heat the oil without the application of direct flame to any vessel or element in contact therewith, but provide the necessary heat by passing heated gases and vapors in direct contact with the oil. These heat carrying gases and vapors may be generated in the cycle itself from the oil or liquid hydrocarbons under treatment, or may be other hydrocarbon bearing gases, such as natural gas or casing-head gas from oil wells, or mixtures of these gases, which aspect of my invention enables me not only to convert liquid hydrocarbons into the desired light products, but also to recover or convert the light vapor products from natural and casing-head gas in combination with the products recoverable from the liquid hydrocarbons.

Briefly stated, the preferred embodiment of the invention, to be hereinafter described in greater detail, consists in heating hydrocarbon bearing gases and vapors preferably gradually at one point in a cycle, employing these gases and vapors at a maximum temperature to heat liquid hydrocarbon materials at another point in the cycle, whereby further vapors are generated from the liquid hydrocarbon, maintaining the system under suitable pressure conditions controlled independently of the temperature conditions, whereby, under the established conditions of temperature and pressure a desired commercial product is produced from the commingled vapors and gases, which product is subsequently recovered by suitable separation treatment, for example, by condensation. A further refinement of the process consists in washing any outgoing gases by means of the incoming liquid hydrocarbon materials, thereby absorbing any vapors contained in said outgoing vapors, and returning such vapors again to the cycle for further treatment.

In the accompanying drawings to be taken as a part of this specification, I have fully and clearly illustrated an apparatus of my invention which is particularly adapted for carrying out my improved process, but I desire it understood that the said process is not limited in any way by reference to said apparatus, as the same may be carried out in other suitable apparatus, without departing from the spirit and scope of said process invention.

In said drawings.

Figure 1:
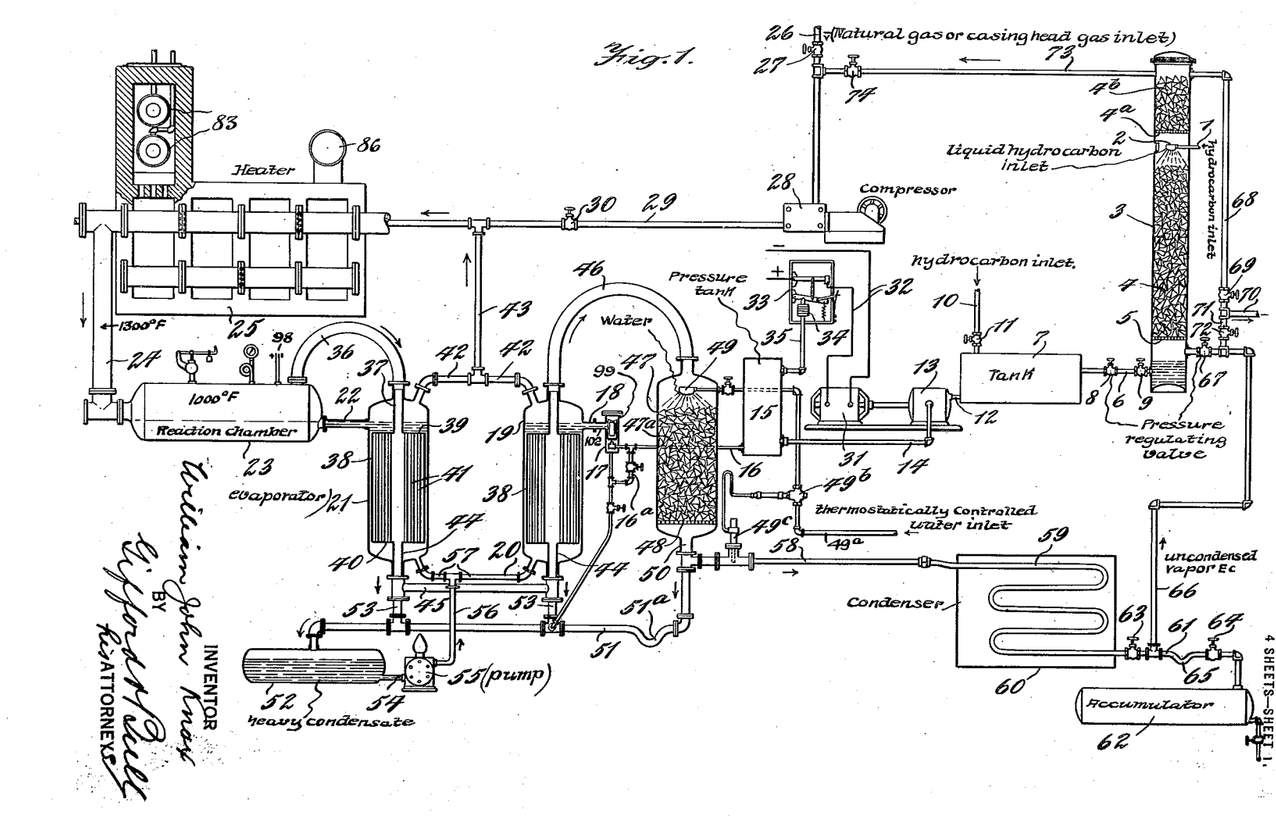
Figure 1 is a partial diagrammatic view, partly in section, showing a complete apparatus adapted to the carrying out of my new process.

In the preferred procedure, to be hereinafter described, I may treat kerosene in order to produce therefrom lower boiling products, such as gasoline or motor spirits, and in connection therewith employ heated natural gas or casing-head gas as the heat carrying medium for supplying the required heat to the kerosene in order to dissociate from the latter the materials or products which of themselves, or in combination with hydrocarbons in said gas will form the desired end product. To the end stated, the liquid hydrocarbon material, for example, kerosene, to be treated or dissociated is caused to flow under pressure from any suitable source through a pipe 1 and spray head 2 into an absorbing chamber 3, said spray head being preferably arranged in the upper part of said absorbing chamber and delivering its spray of liquid hydrocarbon in such a manner as to cause, in this case, the kerosene to trickle over and through blocks of suitable material, presenting large surfaces, shown at 4 and supported upon a grid 5 in said absorbing chamber. The kerosene entering the absorbing chamber and flowing downwardly through and over the material 4 collects in the bottom of the absorber and flows therefrom through an outlet pipe 6 into a storage tank 7, of any suitable construction. The pipe 6 contains a pressure regulated valve 8 and a hand operated valve 9, controlling the flow of liquid therethrough, the function of which will be more fully set forth hereinafter. The tank 7 may be provided with a feed pipe 10 controlled by a hand operated valve 11, through which pipe a supply of oil or liquid hydrocarbon may be admitted to the tank 7 from an external source independently of the supply thereto from the absorber. The tank 7 is provided with an outlet pipe 12 leading to the inlet side of a pump 13, the outlet side of which is connected to a pipe 14 leading to a closed pressure tank 15 into which the liquid hydrocarbon is fed from the pump against a head of air or gas. Connected to the lower portion of the pressure tank is an outlet pipe 16 leading through a level controlling device 17 connected by a pipe 18 to the upper portion of an evaporator or heat interchanger cylinder or chamber 19, said cylinder being connected at its lower end by an outlet pipe 20 with the lower end of a second evaporator chamber or heat interchanger 21. The chamber 21 is connected at its upper end by a conduit 22 with a reaction or cracking chamber 23, the latter having a pipe connection 24 with a heating element, or hydrocarbon heater 25, for a purpose to be presently set forth.

By the arrangement just described, the liquid hydrocarbon is supplied to the reaction chamber 23, wherein the said liquid is adapted to be subjected to the heat of vapors or gases previously heated in the element 25, the heated vapors and gases flowing through the apparatus in reverse direction to the flow of the liquid hydrocarbon, and over and in contact with the surface of the latter.

26 designates a pipe leading from a suitable source of gas supply, for example, of natural gas or casing-head gas containing hydrocarbon vapors or compounds, said pipe being controlled preferably by a hand operated valve 27. The pipe 26 leads to a compressor 28 of any suitable type, the outlet side of which is connected by a pipe 29 controlled by a suitable valve 30, to the inlet side of the heating element 25, wherein the gas supplied by the pipe 26 may be heated gradually and sufficiently to crack or dissociate the hydrocarbons therein, and to heat them to such a point that when admitted to the reaction chamber 23 through the pipe 24 they will evaporate and crack or dissociate the liquid hydrocarbon material in said chamber 23, the result being that the aggregations driven off from the liquid hydrocarbon in said chamber 23 will, under control of the pressure and temperature, recombine with themselves and with the vapor and gas products admitted through the pipe 24 to form a vapor or product of recombination containing the material which it is desired to produce and recover.

The pump 13 may be driven by a suitable motor 31 fed by the leads 32 of a suitable circuit, and controlled by a pressure operated switch 33 of any suitable type, having an expansion element 34 connected by a pipe 35 with the air or gas space in the chamber 15, heretofore described; the arrangement being such that the make-and-break switch will be controlled by the pressure in the chamber 15 to start and stop the motor, in order to provide, by thus controlling the motor and pump, a suitable amount and pressure of oil within the chamber 15.

The cracking or reaction chamber 23 is provided with an outlet vapor pipe 36 connected to the upper end of the evaporator 21, and connecting with a duct 37 therein, opening into a cylinder 38 having heads 39, 40 in which are seated the open ends of vertical tubes 41, through which tubes the oil from the pipe 20 passes upwards on its way to the reaction chamber 23. Cylinder 38 with its heads 39, 40, and tubes 41 through which the liquid hydrocarbon passes is in direct connection as to its interior space with the vapor pipe 36 and the outlet vapor pipe 45 at the bottom, but is sealed off from the oil space in the outer cylinder by means of the packing rings shown in detail in Fig. 6. The oil passes through the tubes 41 and also through the space between the cylinder 38 and the wall of the interchanger. The heated vapors from the cracking chamber 23 pass through the pipes 36, 37, and the space in the cylinder 38 about the tubes 41, thereby serving to initially heat the oil as it flows on its way to the cylinder 23, so that a large part of the heat emerging from 23 is regenerated, and vapors are driven off from the oil, the condensate from the vapors from the cracking cylinder, precipitated by this absorption of heat, settling to the bottom of the cylinder 38, and passing by gravity by means of pipe 53 into the hot well or sump 52, to be described later. The evaporator 19 is preferably constructed similarly to the evaporator or heat interchanger 21 just described, and similar parts therein are referred to by similar reference numerals.

The vapor spaces at the upper ends of the evaporators 19 and 21, over the oil, open through pipes 42 into a pipe 43 which is in direct connection with pipe 29, heretofore described, whereby any vapors driven off the liquid hydrocarbon in the evaporators, 19, 21, may be passed to the pipe 29, and through the latter to the element 25 to be heated or cracked in said element. The vapors from the cracking chamber 23 after flowing into the evaporator 21 emerge from the bottom thereof, through a pipe 44 connected to the lower head of said cylinder, and thence through a pipe 45 to a similar pipe 44 in the cylinder 38 in the evaporator 19, said gases and vapors passing upwards through the cylinder 38 in the evaporator 19, and out through a vapor conduit 46 leading to the upper end of a condenser chamber 47 containing a filling of intercepting elements 47ª, supported on a grid 48. In the upper end of said chamber 47 is a water spray head 49 fed from a pipe 49ª from which spray 49 water is sprayed into the hot incoming vapors and over the elements 47ª, thus removing from the hydrocarbon vapors by condensation the heavy materials which it is desired to separate from the vapor material and allowing only the lighter vapors and gases to pass on.

Leading from the bottom of the condensing chamber 47 is an outlet duct 50 connected at its lower end to a pipe 51 which empties into the hot well or sump 52 heretofore mentioned for the heavy condensates. The connections leading from the evaporators 19 and 21 to the pipe 45 are likewise connected by necks 53 to the said pipe 51, so as to conduct to the latter the heavy condensate which precipitates in the cylinders 38 in the evaporators. The pipe 51 is preferably provided with a trap 51ª to prevent flow of the vapors from the intermediate condenser 47 to the pipe 51. The well 52 is connected preferably by a suitable pipe connection 54 with a pump 55, which serves to pump the oil therefrom through a pipe 56 and branch connections 57, 57, to the lower portions of the evaporators 19 and 21, to thereby return the heavy condensates to the cycle for further treatment. The pipe 50 referred to, is connected at a point between the chamber 47 and the trap 51ª to the conduit 58 leading to the coil 59 in a water cooled condenser box 60, the outlet of said coil being connected to a pipe 61 leading to a well or accumulator tank 62 for the condensed desired product. The pipe 61 is provided with two valves 63, 64 and an intermediate trap 65. Connected to the pipe 61 between the valve 63 and the traps 65 is a conduit 66, connected at its opposite end to the absorbing chamber 3 below the grid 5, said pipe being adapted to pass the gases and uncondensed vapors into the absorber under the grid, so that they may pass upwards through the broken filling material therein, and be subjected to the absorbing action of the liquid hydrocarbon flowing into the absorber through the spray head 2, said liquid hydrocarbon being adapted to collect vapor products from said vapor and gases. In the pipe 66 is a pressure regulating valve 67, which is set to maintain a desired pressure of gases and oil in the system, for example 250 pounds pressure to the square inch, so that said valve will open, or remain open, when the pressure exceeds that amount, but will remain closed under pressure conditions less than the amount stated.

After the gases have passed upward through the descending stream of oil in the absorbing chamber 3, they are allowed to pass as a dry residue gas out through pipe 68, and valve 69, to pipe 70, through which said gases are delivered to a point of storage or consumption. The lower end of pipe 68 is connected by a pipe 71 to the said pipe 66, said connection 71 containing a valve 72, by the proper operation of which, i. e., opening the same, the gas passing upwards through pipe 66 may be deflected to the pipe 70, instead of passing into the absorber. In the upper portion of chamber 3 is a grid 4ª located above the oil spray device 2 upon which grid is placed a filling of broken material 4^b, by which the particles of oil carried upwards mechanically by the gas stream are caught by the filling and retained in the absorbing chamber, permitting only dry residue gas to pass to the said discharge pipe 68.

The upper end of the absorber is connected by a pipe 73 to the pipe 26 heretofore described, said pipe containing a valve 74. By closing the valves 69 and 27, and opening the valve 74, the dry residue gas may be returned to the cycle by means of the compressor 28 to be utilized as a heat carrier instead of employing natural gas or casing-head gas, as previously described.

In the foregoing I have described one form of apparatus adapted to carry out my improved method, and will now describe the process as practiced by said apparatus in order to produce gasoline or light product from a heavier product, for example kerosene, employing casing-head gas as the heat carrier or medium for heating the heavier oil, i. e., kerosene, the heat carrier being augmented preferably but not necessarily in volume by the heavier vapors driven off from the oil in the evaporators. It is understood, however, that oils heavier or even lighter than kerosene may be used as the liquid hydrocarbon to be cracked, and the nature of the resulting desired product may be varied by varying the temperature and pressure conditions within the cycle.

I first establish the desired pressure in the system by compressing casing-head or natural gas throughout the same. This is done by means of the compressor 28, and the pressure regulating valve 67 controls and establishes the desired pressure and flow of gas. As heretofore stated in acting upon kerosene to produce gasoline, this pressure may be at 250 pounds to the square inch. The liquid hydrocarbon, for example, kerosene, enters the system through the pipe 1, and trickles down over the extended surfaces of the filling 4 in the absorbing chamber 2, from which it passes through the intermediate apparatus to the first evaporator chamber 19, thence through the pipe 20 to the chamber 21, in which evaporating or heat interchanging chamber the oil is initially heated by the hot gases emerging from the reaction chamber 23. By this arrangement, the oil is first heated in the evaporator chamber 19 by the vapors and gases coming from chamber 21, and is then heated in the evaporator chamber 21 by the hotter vapors and gases coming from the reaction chamber 23, and thence flows into the chamber 23, to be subjected therein to the hot gases and vapors contacting with it from the heater 25. The result is that the oil is gradually heated at a comparatively lower temperature and then has its temperature raised gradually until it reaches the cracking chamber 23, and I am thereby able to apply heat gradually to the oil so that the heavier, most easily dissociable molecules of the oil will begin to break down at a point of low temperature, and the most difficulty dissociable molecules will be subjected to a gradually increasing temperature and will be dissociated in the order of their resistance to heat in the passage of the oil to the point of maximum temperature within the reaction chamber 23. By this method of procedure, violently disruptive and destructive dissociation is prevented, carbon, tar and fixed gases, such as hydrogen, are formed only in small amounts, and a higher percentage of the hydrocarbons is converted into the desired product corresponding to the temperature and pressure conditions established, than by other methods of which I am aware. The vapors driven off in the evaporators 19, 21, pass through the pipes 42 and 43 to the pipe 29, to be mixed with the natural gas or casing-head gas heat carrier and augment its volume. By this procedure the vapors carried in the oil by absorption in the absorbing chamber are liberated largely in the evaporator 19, and the remaining heavier oil passes into the hotter evaporator 21 wherein a portion of the oil itself is evaporated, the vapors in both evaporators being trapped under the domes passing out under its own vapor pressure through the pipes 42, 43, to the pipe 29, and thence to the heating element pipe 29, and thence to the heating element or hydrocarbon heater 25 where the said vapors in passing through the heater meet gradually increasing temperatures, which act successively to break down the constituents of the vapor, the constituents being broken down in the inverse order of their resistance to heat, and the formation of carbon and other undesirable products largely avoided.

Figure 3:
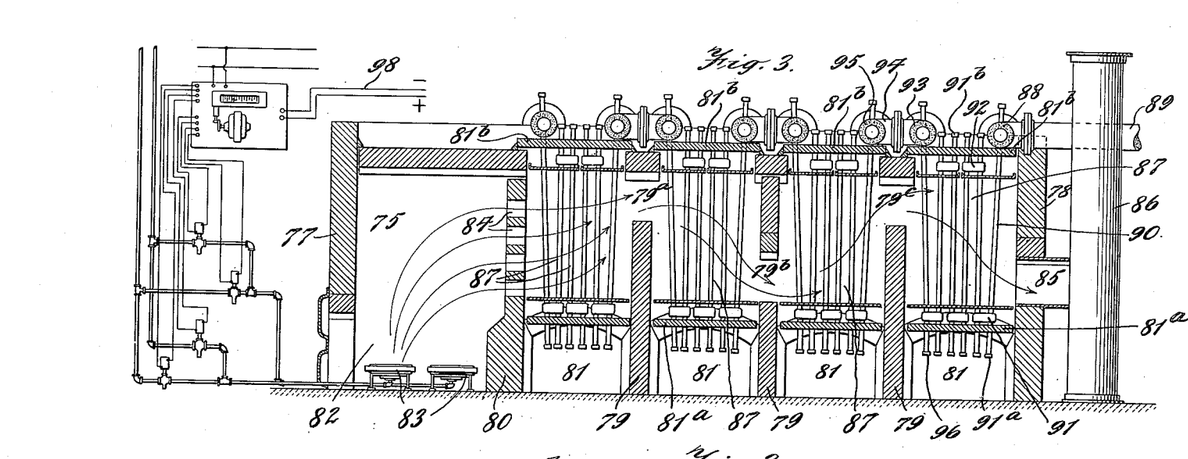
Fig. 3 is a vertical section on the line 3—3 of Fig. 2.

It is to be understood that in order to cause the formation of a definite desired product a definite pressure condition must be maintained, which has been described above, but it is also necessary to maintain a definite maximum temperature of reaction. If this temperature is exceeded destructive dissociation will be caused. In Fig. 3 is shown a well known device in combination with the hydrocarbon gas or vapor heater, which controls the flow of gas and air to the burners in the fire-box and is pyrometrically controlled from the reaction chamber 23 by a pyrometer couple, not shown. If the definite desired temperature to be maintained in the cracking chamber 23 is exceeded, then the pyrometric controlling device will shut off some of the gas and air to the burners automatically; if this temperature becomes lower than desired then more gas and air will be allowed to flow to the burners. I preferably use such an automatic means of temperature control, whereby a more uniform temperature condition is maintained in addition to the uniform control of pressure, described above, by means independent of the temperature. I have found that a pressure of approximately 250 pounds to the square inch is the most favorable pressure to maintain in the apparatus when using kerosene as the liquid hydrocarbon to be cracked and converted into gasoline or motor spirits, and the temperature in the cracking or reaction chamber 23 should be maintained at approximately 1,000 degrees Fahrenheit. In order to maintain 1,000° F. in the cracking cylinder, it is usually necessary to raise the temperature of the heat carrying gases and vapors leaving the heater to approximately 1,300 degrees F., so that there will be sufficient temperature head to supply the heat energy to do the work of evaporation and conversion of the liquid hydrocarbons. Dissociation of the liquid hydrocarbon material occurs in the heat interchangers or evaporators as well as in the reaction chamber, and a large portion of these dissociated products passes off through the hydrocarbon heater as vapors and are further dissociated into smaller molecular aggregates in their passage therethrough, but the greatest amount of conversion and combination into the desired product, gasoline, occurs in the reaction chamber 23, in which the heat carrying hydrocarbons from the heater 25 impinge upon the liquid hydrocarbon material therein and commingle with the cracked vapors produced therefrom and a mutual recombination occurs under the most favorable pressure-temperature conditions.

As heretofore described, these gases and vapors are then passed through the evaporator chambers 19, 21, and serve to initially heat and crack the oil therein, and then pass to the intermediate condenser 47 where the heavy condensates not desired in the final product are condensed or knocked back by the water spray, and the gases and vapors containing the desired products, gasoline, are caused to pass to the final condenser 60. The heavy condensates from the heat interchangers and the intermediate condenser 47 flow by gravity into the hot well or sump 52 and are returned by the circulating pump 55 to the heat interchangers 19, 21, to be subjected again to retreatment. It will be seen that the body of liquid oil to be cracked or treated is not at any time subjected to the carbonizing effect of direct flame or other source of heat applied to the wall of the chambers, but is subjected only to the hot cracked products from the element 25, and to the gradually cooling products from the reaction chamber 23.

The gases and vapors containing the desired product pass through the condenser 60 and are caught in the accumulator tank or gasoline well 62, the lighter gases and vapors passing out through the pipe 66 to the absorber 3, whence after their lighter vapors have been absorbed by the incoming liquid hydrocarbon, for example, kerosene, and returned therewith to the cycle, they are allowed to escape out of the system to a point of use or storage, or are returned to the cycle again to act as heat carriers and to further augment the desired product, as has been set forth.

The process is a continuous one, and is preferably operated in a cyclic manner as described; the oil under the pressure conditions is continuously fed through the cycle to the chamber 23 in one direction while the heat carrying hydrocarbon gases are caused to pass through the cycle in the reverse direction; light vapors tending to escape with the residue gases are absorbed by the incoming oil in the absorbing device and returned to the cycle and by the preferred counter arrangement of flow of oil and vapors, a large part of the heat is conserved and returned to the system.

A further advantage of my process is that I am able to use practically all of the vapors in casing-head gas for the purpose of producing the desired product, for example, gasoline; this refers not only to those vapors which ordinarily form gasoline, but also to the vapors lighter than the gasoline vapors which I am able to combine with the vapor from the liquid hydrocarbon to produce the gasoline containing product. This is accomplished by causing the vapors remaining after final condensing to pass in contact with the incoming hydrocarbon liquid, and upon being absorbed thereby to be carried back into the system to be subjected to the temperature and pressure conditions therein. In thus passing back through the system in a cyclic manner, these lighter vapors either are caused to recombine with other cracked products to form the desired product, or are further broken down into fixed gases, which finally pass out of the system through the absorbing tower as a valuable by-product. Thus I control both my temperatures and pressures with regard to the most favorable conditions to secure the maximum of cracking and recombination, but I also am able to treat efficiently the lighter vapors which are the most difficult to crack and recombine, whereby they are converted into desirable products.

In regard to the word "cracking" I use it to mean not necessarily the absolute breaking up of molecules into smaller molecules and unsaturated "fragments" of molecules, but also the condition of freedom of the atoms caused by the high temperature, whereby combination may more easily take place than at lower temperatures.

The heat used in the conversion of the vapors and oils within the apparatus is preferably conveyed within the pipes and vessels of the apparatus by means of the heated hydrocarbon gases and vapors, but in case it is desired to use casing-head gas or natural gas, or possibly neither one, then the connection between the control 25 and the absorbing chamber may be so controlled by properly positioned and adjusted valves, that the light gases and vapors, generated within the apparatus itself, may be recirculated after passing the final condenser and thus serve to act as a heat carrier.

By the process above described, I am able not only to dissociate hydrocarbon liquid to produce a desired product, but also am able to recover the desirable constituents of casing-head gas, and also to convert the other lighter constituents thereof into gasoline or other light liquid products, which lighter constituents under the old process have hitherto been necessarily lost on account of their extreme volatility by evaporation, or "weathering."

In the specificatiion I have used the term gas in the sense of a fixed gas, and the term vapor as meaning a condensable volatile matter, and wherever I have used the term gases and vapors, or gas and vapor, I mean that matter which may consist and probably does consist of a combination of fixed gas and condensable matter. In the system described no matter whether natural gas or casing-head gas is supplied from the compressor 28, the atmosphere of the system consists of fixed gas or gases and vapor or vapors of volatile condensable hydrocarbons in varying proportions up to the absorber 3 wherein substantially all remaining volatile matter or vapor is absorbed or entrained by the liquid hydrocarbon, and dry fixed gas, i. e, gas free from vapor, is fed through the valve 74 to the system or is separated out by way of the pipes 68 and 70.

In the practice of my process I do not desire to be, limited to any particular type of apparatus, but show and describe herein a preferred apparatus which is in itself novel, and which contains elements or parts in themselves novel and of my invention. Referring to these novel features individually, I will describe them as follows:—

The heating element 25, as far as the process is concerned, may be of any suitable construction which will produce the desired heat effect upon the gaseous or vaporous material subjected thereto, but I have devised a heating element which is as follows:—

Figures 2, 4:
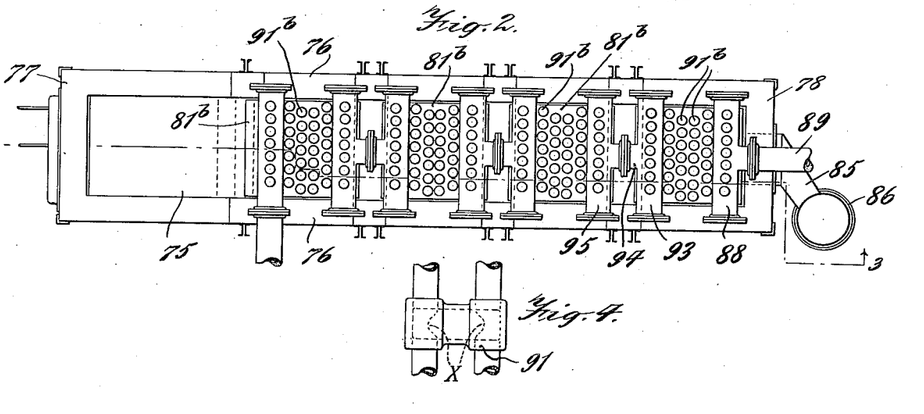
Fig. 2 is a plan view, partly in horizontal section, of a heating apparatus for heating the gas, or hydrocarbon bearing vapor, which is employed for heating the liquid hydrocarbons or compounds, preferably by direct contact with the latter.
Fig. 4 is a detailed view of an element of the heating apparatus shown in Figs. 2 and 3.

Referring particularly to Figures 2, 3 and 4 of the drawings, 75 designates an oblong furnace chamber made up of vertical side walls 76, and vertical end walls 77, 78, said chamber being divided by internal vertical cross or baffle walls 79, and a bridge wall 80, into a plurality of heating chambers, shown respectively at 81, and a furnace chamber proper 82. In the chamber 82 is arranged a suitable heating means, preferably for liquid or gaseous fuel, as shown at 83. The bridge wall 80 is provided with openings 84 through which the heated gases may pass from the chamber 82 to the several chambers 81 in succession. The first wall 79 is provided with an opening 79$^a$ near its upper portion, the second wall with an opening 79$^b$ near its intermediate portion and the third wall 79 with an opening 79$^c$ near its upper portion, whereby the heated gases are caused to take a circuitous path lengthwise of the chamber 75. The rear wall 78 is provided near its intermediate portion with an opening leading into a flue duct 85 communicating with a stack 86. In each of the chambers 81 is arranged a bank or set of vertically disposed connecting tubes 87 through which the gases or vapors to be treated are passed, in order to sufficiently heat and decompose the same before being fed to the duct 24 leading to the reaction chamber 23. In each of the chambers 81 above the bottom thereof, is arranged a tile floor 81$^a$ which serves to close the heating portion of the chamber and prevent escape of the heated gases flowing from the chamber 82. At its top each chamber is closed in a similar manner by a tile cover 81$^b$ through which the upper portions of the tubes 87 pass. Arranged on top of the heating element is a transverse inlet header 88 to which is connected an inlet pipe 89 with which the pipe 29, heretofore described, communicates and delivers the vapor or gases from the compressor 28 and pipe 43. From this transverse header 88 the fluid is delivered into the series 90 of a bank of tubes 87. The lower end of each tube being connected to a header box 91 located above the floor 81$^a$, there being an individual header box for each of said tubes. Connected to each of the individual headers is the lower end of a tube of the next series in the bank, the upper end of said tube being connected to an upper individual header 92 located adjacent the wall 81$^b$. Each of these individual header boxes is in turn connected to the upper end of a tube of the next series in the bank, the lower end of which is in turn connected to a lower individual header box similar to the box 91, which arrangement is continued throughout the series so as to produce an up and down circuitous path of the vapor and gases through the bank of tubes. The upper ends of the last set of tubes are connected to a cross header 93 arranged above the wall 81$^b$ and extending transversely of the heating element, said header being connected by a cross connection 94 with an inlet cross header 95 leading to the next series or bank of tubes, and corresponding to the header 88, heretofore described. In view of the fact that all of the series or banks of tubes may be arranged and constructed in the same manner as the first set described, it is not necessary to repeat the description.

I preferably pass the ends of the tubes 91 through the individual header box both at the top and bottom of the bank, in order to provide dead ends 91$^a$, 91$^b$, which extend into the atmosphere and are capped as at 96. These dead ends are projected outside of the path of the heating gases in order to be cooled by the atmosphere so that they will be readily accessible for opening to receive a scraper or other tool for cleaning the interior of the tubes when necessary. By this arrangement the caps 96 are not subjected to heat and may be readily removed and replaced without danger of destruction and each individual tube may be readily cleaned.

The header box is shown in detail in Fig. 4, the tubes 91 extending through the said box and communicating therewith through side openings $x$ indicated in dotted lines. By the arrangement shown it will be seen that the vapor or gaseous material admitted to the inlet pipe 89 will flow in a circuitous path from the coolest point of the heating element toward the hottest point, so that said vapors or gases are heated gradually and not subjected to sudden high heat which would be likely to result in complete dissociation and deposit of tar and other materials likely to clog the pipes.

At the left of Fig. 3 I have shown a heat control for controlling the flow of gas and air to the heater 83 so as to maintain the proper uniform heating conditions in the heating element. This is preferably an electric control of well known form, the leads 98 of which are connected to a pyrometer couple (indicated in Fig. 1 only) in the chamber 23 by means of which the predetermined temperature in chamber 23, acting on the pyrometer couple in 23, actuates the heat regulating device and controls the supply of fuel and air to the heating means 83.

In view of the fact that this control is not specifically of my invention, and other heat controls may be employed, so long as they produce the desired result, I do not describe the same specifically. For example, the control may be any of the standard controls now on the market for the purpose, that shown being the one known as the Bristol gas furnace control. The above description will be sufficient for a clear understanding of the function and operation of the heating element constituting my invention.

In Fig. 1 I have shown a thermostatic control 49$^c$ subjected to the temperatures of the outflowing gases in the pipe 58 and employed to control a valve 49$^b$ in the water supplied to the head 49, so that the amount of water flowing is regulated by the predetermined temperature maintained in the outgoing gases. This thermostatic control may be of any suitable type, for example, the Sarco thermostatic control and specifically is not of my invention, although my invention contemplates broadly the use of any suitable thermostatic control.

Figures 8, 9, 10:
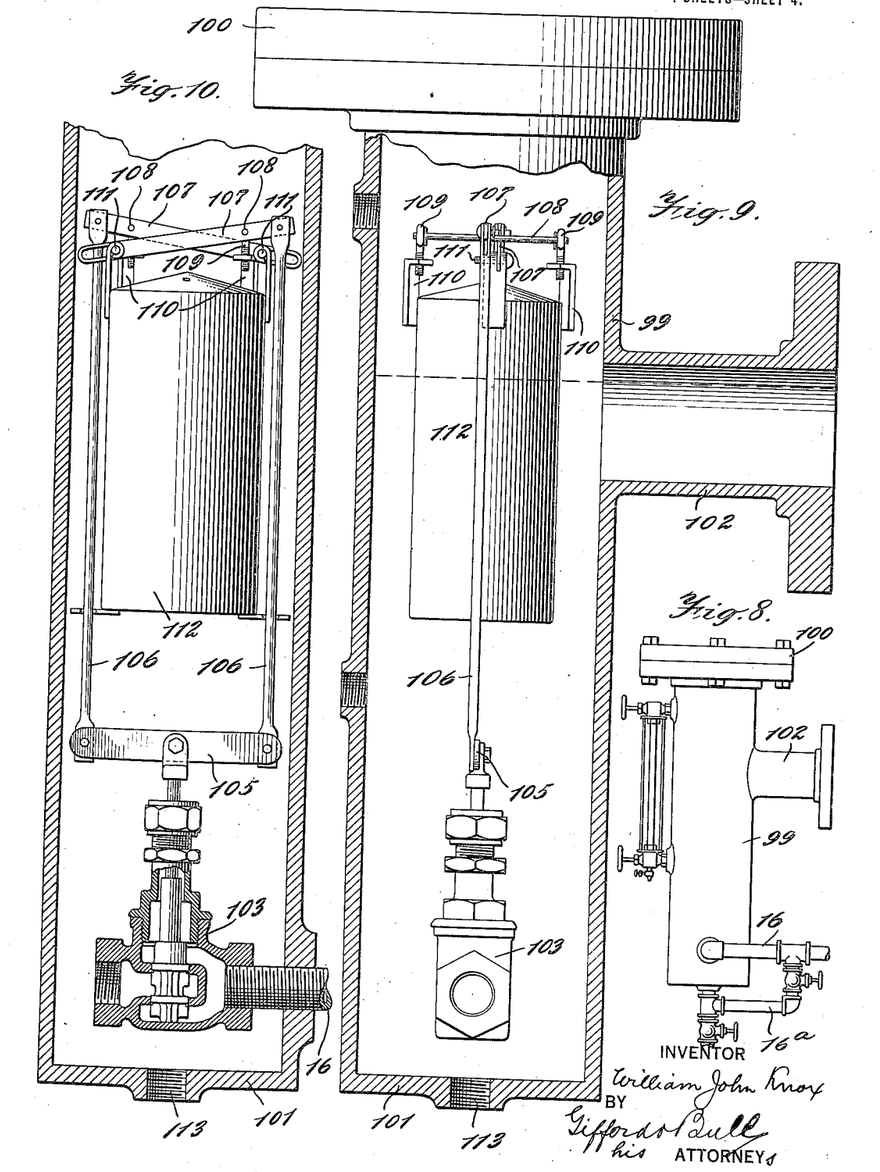
Fig. 8 is a view in vertical elevation of a liquid level controlling device for maintaining a constant level of the liquid hydrocarbon material in the apparatus.
Fig. 9 is a vertical section centrally through the device shown in Fig. 8.
Fig. 10 is a vertical central section through the device shown in Fig. 8, but taken on a plane at right angles to the plane of section shown in Fig. 9.

In Fig. 1 I have indicated a level control 17 for maintaining the desired level of the liquid or oil being treated in the evaporators 19 and 21 and the reaction chamber 23. Any suitable type of level control may be employed, but the one shown and described is one invented by me as particularly adapted to the purpose for which I employ it. I have shown this level control specifically in Figs. 8, 9 and 10 of the drawings in which is shown a casing 99 closed at its upper portion by a head 100 and its lower portions by head 101, said casing having a neck 102 by which it is connected to the pipe 18, heretofore described. Within this casing 99 is arranged a balanced piston valve 103, the stem of which is pivotally connected to a cross bar 105, the opposite ends being connected by connecting rods 106, to levers 107 pivoted on bars 108 mounted in bearings 109 on brackets 110 fixed to the casing 99. The opposite ends of these levers are connected by a pin-and-slot hinged connection 111 to the upper end of a float tank 112 which rises and falls as the level of the oil changes within the casing 99. By this arrangement the rising and falling movement of the float tank causes a reverse movement of the piston in the valve 103, and regulates the amount of oil admitted to the chamber through the pipe 16. The pipe 16 may be connected by a by-pass 16$^a$ about the control device 17, whereby the latter may be thrown out of service and the oil be admitted directly to the chamber through the opening 113, instead of being caused to flow through the valve 103.

Figure 5:
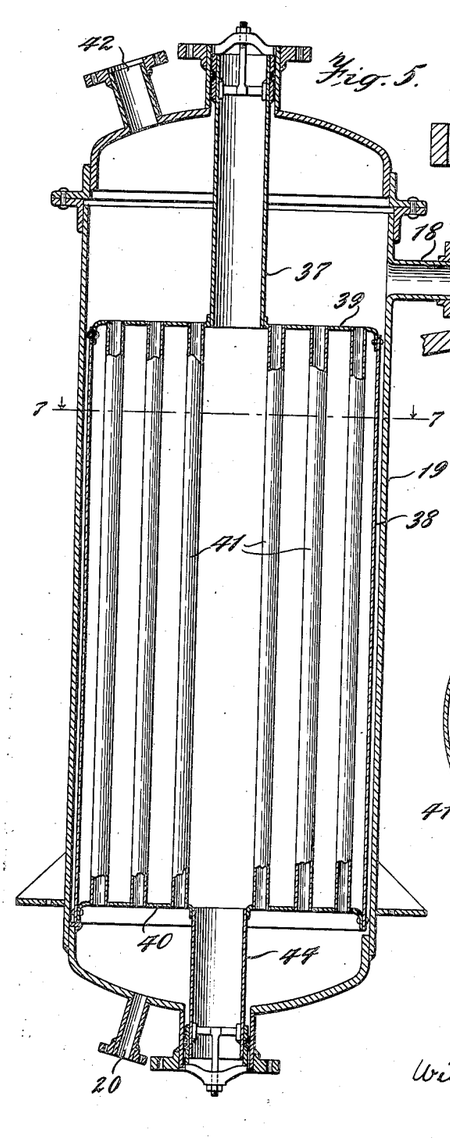
Fig. 5 is a vertical, central, longitudinal section through a heat interchanger, constituting an evaporator, for initially heating the liquid hydrocarbon materials before the latter are subjected to the highest point of temperature in the cycle.
Figure 6:
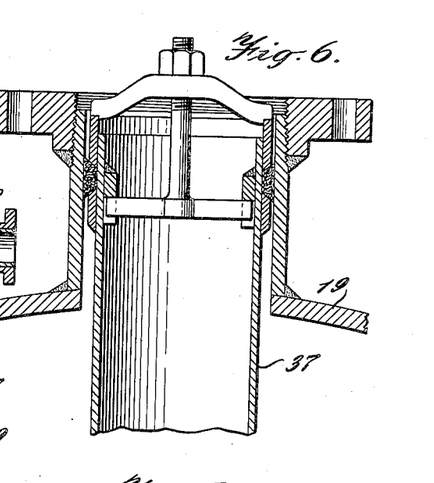
Fig. 6 is an enlarged detailed sectional view through a packing device for sealing the necks between the inner and outer drums of said heat interchanger or evaporator.
Figure 7:
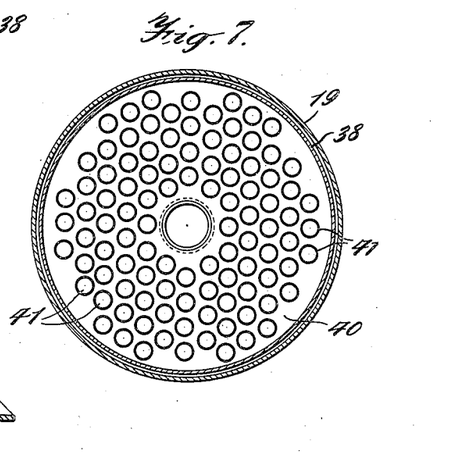
Fig. 7 is a section on the line 7—7 of Fig. 5.

In Figs. 5, 6 and 7 I have shown in enlarged detail the specific construction of the evaporator chambers 19 and 21, the same also being my invention.

What I claim and desire to secure by Letters Patent of the United States is:—

1. A process of producing hydrocarbon compounds which consists in evolving hydrocarbon vapor from hydrocarbon liquid at one point, heating the evolved vapor at a second point to a temperature sufficient to dissociate the hydrocarbons therein, utilizing the said heated dissociated vapor by contacting the same with the surface of hydrocarbon liquid at a third point to heat the latter and to evolve vapor therefrom, employing the resulting commingled vapor to evolve further vapor at the first point, and subsequently subjecting the said commingled vapor to condensation.

2. A process of producing hydrocarbon compounds which consists in evolving hydrocarbon vapor from hydrocarbon liquid at one point, heating the vapor at a second point to a temperature sufficient to dissociate said vapor, contacting the heated dissociated vapor with the surface of hydrocarbon liquid at a third point at a temperature sufficient to crack the same and to evolve and crack vapor therefrom, utilizing the resulting commingled vapors to evolve further vapor from hydrocarbon liquid at the first point, continuing the operation in a cyclic manner, and subsequently subjecting the said commingled vapors to condensation.

3. A process of producing hydrocarbon compounds which consists in evolving hydrocarbon vapor from hydrocarbon liquid at one point, heating the vapor at a second point to a temperature sufficient to dissociate said vapor, contacting the heated dissociated vapor with the surface of hydrocarbon liquid at a third point at a temperature sufficient to crack the same and to evolve and crack vapor therefrom, utilizing the resulting commingled vapors to evolve further vapor from hydrocarbon liquid at the first point, continuing the operation in a cyclic manner, condensing out from the said resulting commingled vapors the fractions of higher boiling-points, returning the resulting heavy condensates continuously to the system, and subsequently condensing the remaining vapor to recover a desired liquid product.

4. A process of producing hydrocarbon compounds which consists in evolving hydrocarbon vapor from hydrocarbon liquid at one point, simultaneously maintaining the system under superatmospheric pressure by mechanically compressing thereinto hydrocarbon gas from an external source, heating the evolved vapor and hydrocarbon gas at a second point, contacting the said heated vapor and gas with the surface of hydrocarbon liquid at a third point to heat the latter and to evolve vapor therefrom, utilizing the commingled heated vapor and gas to evolve further vapor from hydrocarbon liquid at the first point, and subsequently submitting the commingled vapors to condensation.

5. A process of producing hydrocarbon compounds which consists in evolving hydrocarbon vapor from hydrocarbon liquid, simultaneously maintaining the system under superatmospheric pressure by mechanically compressing hydrocarban gas thereinto from an external source, heating the evolved vapor and said gas to a temperature sufficient to dissociate the vapor, maintaining a pressure sufficient to recombine the dissociated vapor into a desired product, continuously utilizing the heated gas and vapor to evolve further hydrocarbon vapor from the said hydrocarbon liquid, and subsequently separating out a desired product by condensation.

6. A process of producing hydrocarbon compounds from hydrocarbon liquid and hydrocarbon vapor which consists in mechanically maintaining superatmospheric pressure within a system by means of hydrocarbon gas and propelling said gas through the system, adding hydrocarbon vapor thereto, heating the commingled gas and vapor to a temperature sufficient to crack the vapor therein, contacting the heated gas and vapor with hydrocarbon liquid to evolve further hydrocarbon vapor, and submitting the resulting commingled vapor to condensation.

7. A process of producing hydrocarbon compounds from hydrocarbon liquid and hydrocarbon vapor which consists in feeding into the system compressed hydrocarbon gas and thus maintaining a superatmospheric pressure within the system, commingling hydrocarbon vapor with the gas, heating the gas and vapor in the absence of liquid, contacting the heated gas and vapor with the surface of hydrocarbon liquid to evolve vapor therefrom, utilizing the resulting gas and vapor to preheat said hydrocarbon liquid in a countercurrent unit, subjecting the said gas and vapor to cooling and condensing conditions, submitting the remaining uncondensed vapor and the gas to compression, and returning the same to the system to maintain a desired superatmospheric pressure condition therein.

8. A process of producing hydrocarbon compounds which consists in feeding into the system compressed hydrocarbon gas, thus maintaining a superatmospheric pressure within the system and mechanically propelling the hydrocarbon gas throughout the system, commingling hydrocarbon vapor with the gas, heating the gas and vapor in the absence of liquid to crack the vapor therein, contacting the heated gas and cracked vapor product with the surface of hydrocarbon liquid to crack the latter and to evolve and crack vapor therefrom, utilizing the commingled gas and cracked vapor products to preheat and crack hydrocarbon oil in a counter current unit, subjecting the said gas and vapor to cooling and condensing conditions, submitting the remaining uncondensed vapor and the gas to compression, and returning same to the system to maintain a desired superatmospheric condition therein.

9. A process of producing hydrocarbon compounds for hydrocarbon liquid and hydrocarbon vapor which consists in feeding into the system compressed hydrocarbon gas, thus maintaining a superatmospheric pressure within the system, commingling hydrocarbon vapor with the gas, heating the gas and vapor in the absence of liquid, contacting the heated gas and vapor with the surface of hydrocarbon liquid to evolve vapor therefrom, utilizing the resulting gas and vapor to preheat said hydrocarbon liquid in a counter-current unit, condensing out from the gas and vapor the fractions of higher boiling points, returning the resulting heavy condensate continuously to the system, subjecting the remaining gas and vapor to cooling and condensing conditions to recover a desired product, submitting the residue gas and uncondensed vapor to compression, and returning the same to the system to maintain a desired superatmospheric pressure condition therein.

10. A process of producing hydrocarbon compounds from hydrocarbon liquid and hydrocarbon vapor which consists in feeding into the system compressed hydrocarbon gas, thus maintaining within the system a superatmospheric pressure independent of the temperature condition, commingling hydrocarbon vapor with the gas, heating the gas and vapor in the absence of liquid to a temperature sufficient to crack the vapor therein, contacting the heated gas and cracked vapor with the surface of hydrocarbon liquid to crack the latter and to evolve vapor therefrom and to crack the evolved vapor, utilizing the resulting gas and cracked vapor to preheat and crack hydrocarbon liquid in a counter-current unit, condensing out from the gas and vapor the fractions of higher boiling points, returning the resulting heavy condensates continuously to the system, subjecting the remaining gas and vapor to cooling and condensing conditions to recover a desired product, submitting the residue gas and uncondensed vapor to compression, and returning same to the system to maintain a desired superatmospheric pressure and a desired hydrocarbon atmosphere therein.

11. A process of producing hydrocarbon compounds which consists in mechanically compressing hydrocarbon gas into a system to maintain superatmospheric pressure within the system, evolving hydrocarbon vapor from hydrocarbon liquid within the system, commingling the said vapor with the said gas, heating the commingled gas and vapor, and causing the same to contact directly with said hydrocarbon liquid, said commingled gas and vapor being heated to a temperature sufficient to constitute the sole agent for evolving vapor products from the said hydrocarbon liquid from which the hydrocarbon vapor was derived.

12. A process of producing hydrocarbon compounds which consists in mechanically propelling hydrocarbon gas at one point, commingling hydrocarbon vapor with the gas at a second point, heating the thus commingled gas and vapor at a third point to a temperature sufficient to crack the hydrocarbons therein, and contacting the heated gas and cracked vapor with liquid hydrocarbon at a fourth point, the heated gas and cracked vapor being maintained at a temperature sufficient to constitute a sole agent for evolving vapor products from said liquid hydrocarbon when in contact therewith.

13. The process of producing hydrocarbon compounds, which consists in feeding petroleum into a chamber, heating the petroleum while in said chamber by contacting heated hydrocarbon vapor and hydrocarbon gas therewith as the sole heating means, employing the resulting vapor and gas to heat the petroleum previously to being supplied to said chamber, condensing said resulting vapor at a determined temperature, and passing the uncondensed vapor and gas in absorbing contact with the unheated petroleum oil previously to being heated by said resulting vapor and gas.

14. The process of producing hydrocarbon compounds, which consists in feeding petroleum into a chamber, heating the same by contacting heated hydrocarbon vapor and hydrocarbon gas therewith, under mechanically maintained pressure of said vapor and gas, said vapor and gas being heated to a temperature sufficient to evolve vapor from said petroleum, employing the resulting vapor and gas to heat the petroleum previously to being supplied to said chamber, subjecting said vapor and gas to condensation conditions at a determined temperature, and passing the uncondensed vapor and gas in absorbing contact with the unheated petroleum previously to being heated by said resulting vapor and gas.

15. The process of producing hydrocarbon compounds, which consists in placing petroleum in a chamber, contacting therewith hydrocarbon gas and vapor heated to a temperature sufficient to dissociate said petroleum when contacted therewith and constituting the sole heating means therefor, maintaining said gas under superatmospheric mechanically produced pressure, submitting the resulting vapor to condensing conditions, collecting the condensate, and contacting the uncondensed vapor and the gas with the petroleum before the petroleum is heated.

16. The process of producing hydrocarbon compounds which consists in placing petroleum in a chamber, contacting therewith hydrocarbon gas and vapor heated to a temperature sufficient to dissociate said petroleum and under mechanically produced pressure conditions of the said gas and vapor, employing the resulting vapor produced in said chamber to preliminarily heat said petroleum before admission to said chamber, submitting said resulting vapor to condensing conditions, collecting the condensate, and contacting the uncondensed vapor with the petroleum before the latter is heated preliminarily.

17. The process of producing hydrocarbon compounds, which consists in heating liquid petroleum in a chamber by contacting therewith hydrocarbon gas and vapor heated to a temperature sufficient to dissociate said liquid petroleum, permitting the resulting vapor to combine with said heated hydrocarbon vapor under mechanically produced pressure, and subjecting said vapor combination to condensation conditions to separate the desired product.

18. The process of producing hydrocarbon compounds, which consists in heating petroleum in a chamber by contacting therewith hydrocarbon gas and vapor heated to a temperature sufficient to dissociate said petroleum, permitting the resulting vapor to combine with said heated hydrocarbon vapor under mechanically produced pressure, utilizing said vapor combination to preliminarily heat said petroleum before admission to said chamber, and subjecting said vapor combination to condensation to obtain the desired product.

19. The process of producing hydrocarbon compounds, which consists in heating petroleum in a chamber by contacting therewith hydrocarbon gas and vapor heated to a temperature sufficient to dissociate said petroleum, permitting the resulting vapor to combine with said heated hydrocarbon vapor under mechanically produced pressure, utilizing said vapor combination to preliminarily heat said petroleum before admission to said chamber, submitting said vapor combination to condensation to obtain therefrom the desired product, and contacting the uncondensed vapor with said petroleum before the latter is subjected to said heated hydrocarbon vapor.

20. The process of producing hydrocarbon compounds from hydrocarbon liquid and hydrocarbon vapor, which consists in deriving vapor from the hydrocarbon liquid at one point, heating the derived vapor at a second point, contacting the heated vapor with said liquid at a third point to evolve vapor from said liquid, utilizing the resulting vapors to derive additional vapors from the liquid at the first point, continuing the operation in a cyclic manner, and separating out a desired product from the said resulting vapors by condensing at a fourth point.

21. The process of producing hydrocarbon compounds from hydrocarbon liquid and hydrocarbon vapor, which consists in deriving vapor from the hydrocarbon liquid at one point, heating the derived vapor at a second point, contacting the heated vapor with said liquid at a third point to evolve vapor from said liquid, utilizing the resulting vapors to derive additional vapors from the liquid at the first point, continuing the operation in a cyclic manner, separating out a desired product from the said resulting vapors by condensing at a fourth point, and subsequently subjecting the remaining vapors to contact with the liquid hydrocarbon entering the system to absorb and return the said vapor to the system.

22. The process of producing hydrocarbon compounds, which consists in heating a body of petroleum by contacting therewith a hydrocarbon vapor heated to a temperature sufficient to dissociate said petroleum, permitting the resulting dissociated vapor from the liquid petroleum to combine with said hydrocarbon vapor employed as a heating medium, employing said combination of vapors to preliminarily heat said petroleum before said dissociation, condensing said combination to remove material fluid below a determined temperature, subsequently subjecting the remaining vapor to condensing conditions to remove a desired product therefrom, and passing the remaining vapor in contact with the petroleum before the same is heated by said combination of vapors.

23. The process of producing hydrocarbon compounds, which consists in passing liquid petroleum through an absorber and successively therefrom under mechanically produced super atmospheric pressure through a counter-current apparatus and into a chamber, heating hydrocarbon gas and passing the same under said pressure into said chamber in contact with said petroleum and at such temperature as to dissociate vapor from said petroleum, permitting said hydrocarbon vapor and petroleum vapor to commingle and combine under said pressure, and passing the heated gas and said vapor combination through the counter-current apparatus to preliminarily heat said petroleum, then passing said gas and vapor combination through a condenser under temperature conditions condensing higher boiling material therefrom, conducting the lower boiling vapor to a condenser, and passing the remaining gas and vapor through said absorber in absorbing relation to the liquid petroleum therein.

24. The process of producing lower boiling point liquid petroleum from higher boiling point petroleum, which consists in subjecting the higher boiling point liquid petroleum to hydrocarbon gas and vapor heated to approximately 1000° F., and at a mechanically maintained pressure of 250 pounds per square inch independently of the termepature, and condensing the resulting vapor.

25. The process of producing hydrocarbon compounds, which consists in heating a hydrocarbon vapor alone to such temperature as to crack the hydrocarbon therein, passing said vapor in contact with a liquid body of hydrocarbon under such conditions of temperature and pressure of said vapor as to produce a vapor consisting of a combination of said cracked vapor and vapor derived from said liquid body, and containing the desired product in vapor form, and subjecting such combinations of vapors to condensation to recover a desired product.

26. The process of producing hydrocarbon products, which consists in heating casing-head gas and passing the same in contact with a body of hydrocarbon oil and at such temperature as to constitute the sole heating means to produce vapor from said oil and combining said vapor with the casing-head gas, and then condensing.

27. The process of producing hydrocarbon compounds, which consists in heating casing-head gas to such temperature and under such pressure as to crack the hydrocarbon vapor constituents thereof, passing said gas and cracked vapor constituents while thus heated in contact with a body of hydrocarbon oil to crack the latter, permitting the cracked vapor of the casing-head gas and the vapor derived from said body of oil to combine, and then condensing.

28. A process of producing hydrocarbon compounds from hydrocarbon liquid and casing-head gas which consists in feeding casing-head gas into a system, adding hydrocarbon vapor thereto, heating the commingled gas and vapor, contacting the heated gas and vapor with hydrocarbon liquid to evolve further hydrocarbon vapor, and submitting the resulting commingled gas and vapor to cooling and condensing conditions.

29. A process of producing hydrocarbon compounds from hydrocarbon liquid and casing-head gas which consists in feeding compressed casing-head gas into a system, thus maintaining a superatmospheric hydrocarbon pressure within the system independent of the temperature, heating the casing-head gas, contacting the heated casing-head gas with hydrocarbon liquid to crack the latter and to evolve vapor therefrom, and submitting the gas and commingled vapor to cooling and condensing conditions.

30. The process of producing hydrocarbon compounds from hydrocarbon liquid and hydrocarbon vapor in a cyclic system, which consists in bringing the liquid into contact with the escaping gas and vapor from the system, thereby absorbing the vapor therefrom, feeding the liquid thus charged with vapor through a counter-current unit into a reaction chamber, compressing hydrocarbon bearing gas from an external source by means of a compressor to maintain pressure conditions in the system independent of the temperature conditions, conducting the compressed gas through a heating device, passing the thus heated gas into the reaction chamber to contact with the liquid therein, utilizing the resulting vapor and gas to drive off the absorbed vapor and form additional vapor from the liquid in the counter-current unit, passing the thus derived vapor through the heating device in admixture with the said gas to crack the said vapor and to carry additional heat to the reaction chamber, and continuing this operation in a cyclic manner, subjecting said resulting vapor to condensation to separate out therefrom the desired product, and passing the remaining gas and vapor into contact with the hydrocarbon liquid entering the system to absorb the vapor therefrom and return it to the system.

31. The process of producing hydrocarbon compounds from hydrocarbon liquid and hydrocarbon vapor in a cyclic system, which consists in feeding hydrocarbon liquid into contact with the escaping gas and vapor from the system, thereby absorbing vapor therefrom, feeding the liquid thus charged with vapor through a counter-current unit into a reaction chamber, compressing hydrocarbon-bearing gas and vapor from an external source to maintain pressure conditions in the system independent of the temperature conditions, conducting the compressed gas and vapor through a heating device to heat the same and crack the vapor therein, passing the thus heated gas and cracked vapor into the reaction chamber to contact directly with the liquid therein, utilizing the resulting vapor and gas to drive off the absorbed vapor and form additional vapor from the liquid in the counter-current unit, passing the thus derived vapor from the counter-current unit through the heating device in admixture with the said gas to heat and crack said vapor and to carry additional heat to the reaction chamber, and continuing this operation in a cyclic manner, subjecting said resulting vapor to condensation to separate out therefrom the desired product, passing the remaining gas and vapor into contact with the hydrocarbon liquid entering the system to absorb vapor therefrom and return it to the system, and recompressing the residual gas and unabsorbed vapor and returning them to the cycle.

32. The process of producing hydrocarbon compounds from liquid hydrocarbon and hydrocarbon gas and vapor, which consists in feeding the liquid through a counter-current unit into a reaction chamber, compressing hydrocarbon-bearing gas and vapor to maintain pressure conditions within the system independent of the temperature conditions, propelling said gas and vapor through a heating device to heat the same and crack the vapor therein, passing the thus heated gas and cracked vapor into the reaction chamber to contact directly with the liquid therein, employing the resulting vapor and gas to evolve additional vapor from the liquid in the counter-current unit, passing the thus derived vapor in admixture with the gas through the said heating device to crack the vapor and to carry additional heat to the reaction chamber, continuing this action in a cyclic manner, and subjecting said resulting vapor to condensation to separate out the desired product.

33. The process of producing hydrocarbon compounds from liquid hydrocarbon and hydrocarbon gas and vapor, which consists in feeding the liquid through a counter-current unit into a reaction chamber, compressing hydrocarbon-bearing gas and vapor to maintain pressure conditions within the system independent of the temperature conditions and propelling said gas and vapor through a heating device to heat the same and crack the vapor therein, passing the thus heated gas and cracked vapor into the reaction chamber to contact directly with the liquid therein, employing the resulting vapor and gas to evolve additional vapor from the liquid in the counter-current unit, passing the thus derived vapor in admixture with the gas through the said heating device to crack the vapor and to carry additional heat to the reaction chamber, continuing this action in a cyclic manner, subjecting said resulting vapor to condensation to separate out the desired product, and compressing the remaining gas and vapor and propelling the same again through the system in a cyclic manner.

34. In an apparatus of the character described, a heating element, a reaction chamber communicating with the said heating element, means for feeding gas and vapor to said heating element, means for feeding the heated gas and vapor product from the heating element to said reaction chamber, an evaporator communicating with said reaction chamber, and means for feeding liquid hydrocarbon through said evaporator to said reaction chamber.

35. In an apparatus of the character described, a heating element, a reaction chamber communicating with the said heating element, means for feeding gas and vapor to said heating element, means for feeding the heated gas and vapor product from the heating element to said reaction chamber, an evaporator communicating with said reaction chamber, means for feeding liquid hydrocarbon through said evaporator to said reaction chamber, and means for passing vapor from the evaporator to said heating element.

36. In an apparatus of the character described, a heating element, a reaction chamber communicating with the said heating element, means for feeding gas and vapor to said heating element, means for feeding the heated gas and vapor product from the heating element to said reaction chamber, and an evaporator communicating with said reaction chamber, means for feeding liquid hydrocarbon through said evaporator to said reaction chamber, and means for heating said evaporator by the vapors from the reaction chamber.

37. In an apparatus of the character described, a heating element, a reaction chamber communicating with the said heating element, means for feeding gas and vapor to said heating element, means for feeding the heated gas and vapor product from the heating element to said reaction chamber, and an evaporator communicating with said reaction chamber, means for feeding liquid hydrocarbon through said evaporator to said reaction chamber, means for heating said evaporator by the vapors from the reaction chamber, and means for feeding vapors from the evaporating chamber to the heating element.

38. In an apparatus of the character described, a heating element, a reaction chamber communicating with the said heating element, means for feeding gas and vapor to said heating element, means for feeding the heated gas and vapor product from the heating element to said reaction chamber, an evaporator communicating with said reaction chamber, means for heating said evaporator by the gas and vapor from the reaction chamber, an absorber for delivering oil to the evaporator, means for feeding said oil from the evaporator to the reaction chamber, a condenser receiving said gas and vapor after passing through the evaporator, and means for delivering uncondensed vapor from the condenser to the absorber.

39. In an apparatus of the character described, a heating element, a reaction chamber communicating with the said heating element, means for feeding gas and vapor to said heating element, means for feeding the heated gas and vapor product from the heating element to said reaction chamber, an evaporator communicating with said reaction chamber, means for heating said evaporator by the gas and vapor from the reaction chamber, means for feeding liquid hydrocarbon through said evaporator to said reaction chamber, a condenser for condensing said vapor after passing through the evaporating chamber, and a sump for collecting condensate from said evaporator.

40. In an apparatus of the character described, a heating element, a reaction chamber communicating with the said heating element, means for feeding gas and vapor to said heating element, means for feeding the heated gas and vapor product from the heating element to said reaction chamber, an evaporator communicating with said reaction chamber, means for heating said evaporator by the gas and vapor from the reaction chamber, means for feeding liquid hydrocarbon through said evaporator to said reaction chamber, a condenser for condensing said vapor after passing through the evaporating chamber, a sump for collecting condensate from said evaporator, and means for returning the said condensate to the body of liquid hydrocarbon being treated.

41. In an apparatus of the character described, a heating element, a reaction chamber communicating with the said heating element, means for feeding gas and vapor to said heating element, means for feeding the heated gas and vapor product from the heating element to said reaction chamber, an evaporator communicating with said reaction chamber, means for feeding liquid hydrocarbon through said evaporator to said reaction chamber, means for heating said evaporator by vapors from the reaction chamber, a condenser receiving said vapors after passing through said evaporator, an absorber receiving uncondensed vapor from the condenser, means for delivering liquid hydrocarbon to the absorber, and means for delivering the said liquid hydrocarbon to said evaporator.

42. In an apparatus of the character described, a heating element, a reaction chamber communicating with the said heating element, means for feeding gas and vapor to said heating element, means for feeding the heated gas and vapor product from the heating element to said reaction chamber, an evaporator communicating with said reaction chamber, means for feeding liquid hydrocarbon through said evaporator to said reaction chamber, means for heating said evaporator by vapors from the reaction chamber, a condenser receiving said vapors, an absorber receiving uncondensed vapor from the condenser, means for delivering liquid hydrocarbon to the absorber, means for delivering the said liquid hydrocarbon to said evaporator, and means for delivering vapors formed in the evaporator to said heating element.

43. In an apparatus of the character described, a gas-heating element, a reaction chamber communicating with said heating element, means for feeding gas or vapor to said heating element, means for feeding the heated gas and vapor product from the heating element to said reaction chamber, an evaporator communicating with said reaction chamber, means for feeding liquid hydrocarbon through said evaporator to said reaction chamber, means for heating said evaporator by vapor from the reaction chamber, a condenser of intermediate temperature receiving said vapor, a sump for collecting condensate from said evaporator and said condenser, means for returning the said condensate to the body of liquid hydrocarbon being treated, a final condenser receiving the vapor from the said intermediate condenser, and means for delivering vapor formed in the evaporator to said heating element.

44. In an apparatus of the character described, a gas-heating element, a reaction chamber communicating with said heating element, means for feeding gas or vapor to said heating element, means for feeding the heated gas and vapor product from the heating element to said reaction chamber, an evaporator communicating with said reaction chamber, means for feeding liquid hydrocarbon through said evaporator to said reaction chamber, means for heating said evaporator by vapor from the reaction chamber, a condenser of intermediate temperature receiving said vapor, a sump for collecting condensate from said evaporator and said condenser, means for returning the said condensate to the body of liquid hydrocarbon being treated, a final condenser receiving the vapor from the said intermediate condenser, an absorber receiving uncondensed vapor from the final condenser, means for delivering liquid hydrocarbon to the absorber, means for delivering said liquid hydrocarbon to said evaporator, and means for delivering vapor formed in the evaporator to said heating element.

In testimony whereof I have hereunto signed my name in the presence of two subscribing witnesses.

WILLIAM JOHN KNOX.

Witnesses:
 ETHEL JOHNES,
 C. G. HEYLMEIN.